No. 649,508. Patented May 15, 1900.
L. F. CROSBY.
BAIT CASTING HOOK.
(Application filed Sept. 1, 1899.)
(No Model.)
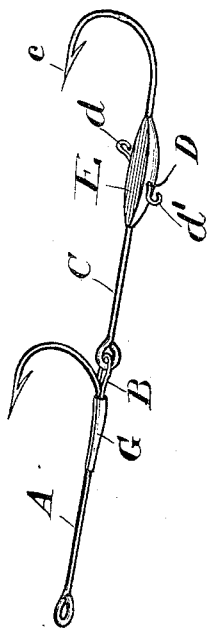
Witnesses:
Chas O Shervey
S. Bliss
Inventor:
Luther F. Crosby
by Wiles Browne & Bitner
Attys.

United States Patent Office.

LUTHER F. CROSBY, OF CHICAGO, ILLINOIS.

BAIT-CASTING HOOK.

SPECIFICATION forming part of Letters Patent No. 649,508, dated May 15, 1900.

Application filed September 1, 1899. Serial No. 729,204. (No model.)

*To all whom it may concern:*

Be it known that I, LUTHER F. CROSBY, a citizen of the United States of America, residing at Chicago, in the county of Cook and State of Illinois, have invented certain new and useful Improvements in Bait-Casting Hooks, of which the following is a specification.

My invention relates to certain improvements in bait-casting hooks for the double purpose of insuring the hooking of the fish, no difference at what part of the bait the fish happens to strike, and also to provide means for weighting or balancing the bait, so as to light and remain right side up.

To such end the invention consists in certain novel characteristics embodied in the fish-hook hereinafter described, and definitely pointed out in the claims.

The drawing represents the hook by means of a single perspective view.

Referring to the drawing, A is a hook of ordinary construction intended to be hooked into the lip or nose of the bait—as, for instance, a frog—in the manner which is customary in the use of this bait. In the most common method of the fishing this hook alone is used and is relied upon to hook the fish, but frequently fails to do so, because the strike is made farther to the rear and the fish catches hold of the bait without touching the hook. This hook in the present invention is designed principally to hold the bait, and as far as the broadest principle of my invention is concerned any other device for taking hold of the nose or forward end of the bait will answer the same purpose. To the shank portion of the hook A contiguous to the bend is secured a loop B, preferably by a wound and soldered joint G. In this loop B a second hook C is hung, provided with a transversely-extending portion D, here shown as a piece of wire of sufficient lateral extent to engage the under portion of the body of the bait and hold the hook C in proper relative position thereto. This is done by means of a rubber band snapped into the hooks $d$ $d'$ at the ends of the wire or by means of a string or other similar appliance passed around the body of the bait. The wire should be bent to the shape of the various kinds of bait which may be used. The point $c$ of the hook C should preferably extend upward behind the hind legs of a frog, where it will be in position to hook the fish that strike as far back as this upon the bait. Adjacent to the transverse wire D is shown a piece of lead E, which is made use of to fasten the cross-wire and also to weight the bait, so that in casting the latter will always fall right side up and will remain in that position while it is reeled in.

More or less variation is possible in various parts of the device, and for that reason I do not confine myself to the specific construction herein shown and described.

I claim as new and desire to secure by Letters Patent—

1. A fish-hook provided with a transverse portion upon the shank of sufficient lateral extent to hold the hook in proper relative position to the bait said transverse portion having means for the attachment of a rubber band or string to tie the hook to the bait; substantially as described.

2. The combination with a hook provided with a transverse portion upon the shank thereof of sufficient extent to hold the hook in proper relation to the bait and a weight secured to said shank and adapted to hold the hook and bait right side up; substantially as described.

3. The combination with a fishing-hook, of a second hook having its eye pivoted to the shank of the first and upon its own shank a transverse portion adapted to bear upon the body of the bait and hold the second hook in proper relative position thereto; substantially as described.

In witness whereof I have hereunto set my hand, at Chicago, in the county of Cook and State of Illinois, this 30th day of August, A. D. 1899.

LUTHER F. CROSBY.

Witnesses:
 CHAS. O. SHERVEY,
 S. BLISS.